United States Patent
Bykov et al.

(10) Patent No.: US 7,721,284 B2
(45) Date of Patent: May 18, 2010

(54) DEPLOYMENT OF MULTIPLE EMBEDDED OPERATING SYSTEM COMPONENTS

(75) Inventors: Sergey I. Bykov, Redmond, WA (US); Charles J. Williams, Sammamish, WA (US); Craig Jensen, Sammamish, WA (US); Harlan Husmann, Woodinville, WA (US); Janine A. Harrison, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1056 days.

(21) Appl. No.: 11/413,655

(22) Filed: Apr. 27, 2006

(65) Prior Publication Data

US 2007/0256070 A1 Nov. 1, 2007

(51) Int. Cl.
*G06F 9/445* (2006.01)

(52) U.S. Cl. .................. 717/178; 717/175; 717/176; 717/177; 717/169; 717/173; 713/2; 719/319; 719/327

(58) Field of Classification Search .................. 717/178, 717/173, 174, 175, 176, 177, 169; 713/1–2; 719/321, 327; 709/202, 232
See application file for complete search history.

(56) References Cited

U.S. PATENT DOCUMENTS

| 5,794,052 A * | 8/1998 | Harding ...................... 717/178 |
| 5,844,986 A * | 12/1998 | Davis ........................ 713/187 |
| 6,438,684 B1 * | 8/2002 | Mitchell et al. ................ 713/1 |
| 6,854,009 B1 * | 2/2005 | Hughes ....................... 709/220 |
| 6,996,828 B1 * | 2/2006 | Kimura et al. ............... 719/319 |
| 7,356,679 B1 * | 4/2008 | Le et al. ........................ 713/1 |
| 7,421,588 B2 * | 9/2008 | Challener et al. ........... 713/193 |
| 2004/0177342 A1 * | 9/2004 | Worley, Jr. ................... 717/121 |
| 2005/0198239 A1 * | 9/2005 | Hughes ....................... 709/222 |
| 2007/0150886 A1 * | 6/2007 | Shapiro ...................... 717/174 |
| 2007/0169070 A1 * | 7/2007 | Drepper ...................... 717/166 |
| 2007/0234344 A1 * | 10/2007 | Hamid et al. ................ 717/174 |
| 2007/0240154 A1 * | 10/2007 | Gerzymisch et al. ........ 717/174 |
| 2008/0104588 A1 * | 5/2008 | Barber et al. ................... 718/1 |

OTHER PUBLICATIONS

Title: Analysis of Parallel Downloading for Large File Distribution, author: Koo et al, Source: IEEE, publication date: May 2003.*
Title: MANTIS OS: an embedded multithreaded operating system for wireless micro sensor platforms, author: Bhatti el al, Source: ACM, publication date: Aug. 2005.*

* cited by examiner

*Primary Examiner*—Chameli C Das
(74) *Attorney, Agent, or Firm*—Merchant & Gould, P.C.

(57) ABSTRACT

The deployment of multiple embedded operating system components provides a designer with flexibility when customizing an embedded operating system for a target computing device. The embedded operating system components provide extra features to expand the functionality of the target computing device. The ease with which the designer may select various embedded operating system components to deploy from an originating computing device to the target computing device simplifies the design process. Configuration data of a core embedded operating system and configuration data of the deployed embedded operating system components are merged and any conflicts between configuration data are automatically resolved without rebooting the target computing device.

17 Claims, 3 Drawing Sheets

DEPLOYMENT OF MULTIPLE EMBEDDED OPERATING SYSTEM COMPONENTS

BACKGROUND

An operating system may be customized for a specific computing device such that less than the entire operating system is installed on the device. The installed operating system includes a core operating system and at least one operating system component that is deployed to the device with the core operating system. Once the customized operating system is installed on the computing device, additional operating system components cannot be deployed to reconfigure the device. The device can only be reconfigured by removing the previously installed operating system and installing a different operating system that is customized for a different purpose.

SUMMARY

The deployment of multiple embedded operating system components provides a designer with flexibility when customizing an embedded operating system for a target computing device. The embedded operating system components provide extra features to expand the functionality of the target computing device. The ease with which the designer may select various embedded operating system components to deploy from an originating computing device to the target computing device simplifies the design process. Configuration data of a core embedded operating system and configuration data of the deployed embedded operating system components are merged and any conflicts between configuration data are automatically resolved without rebooting the target computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Illustrative Operating Environment

Figure 1:
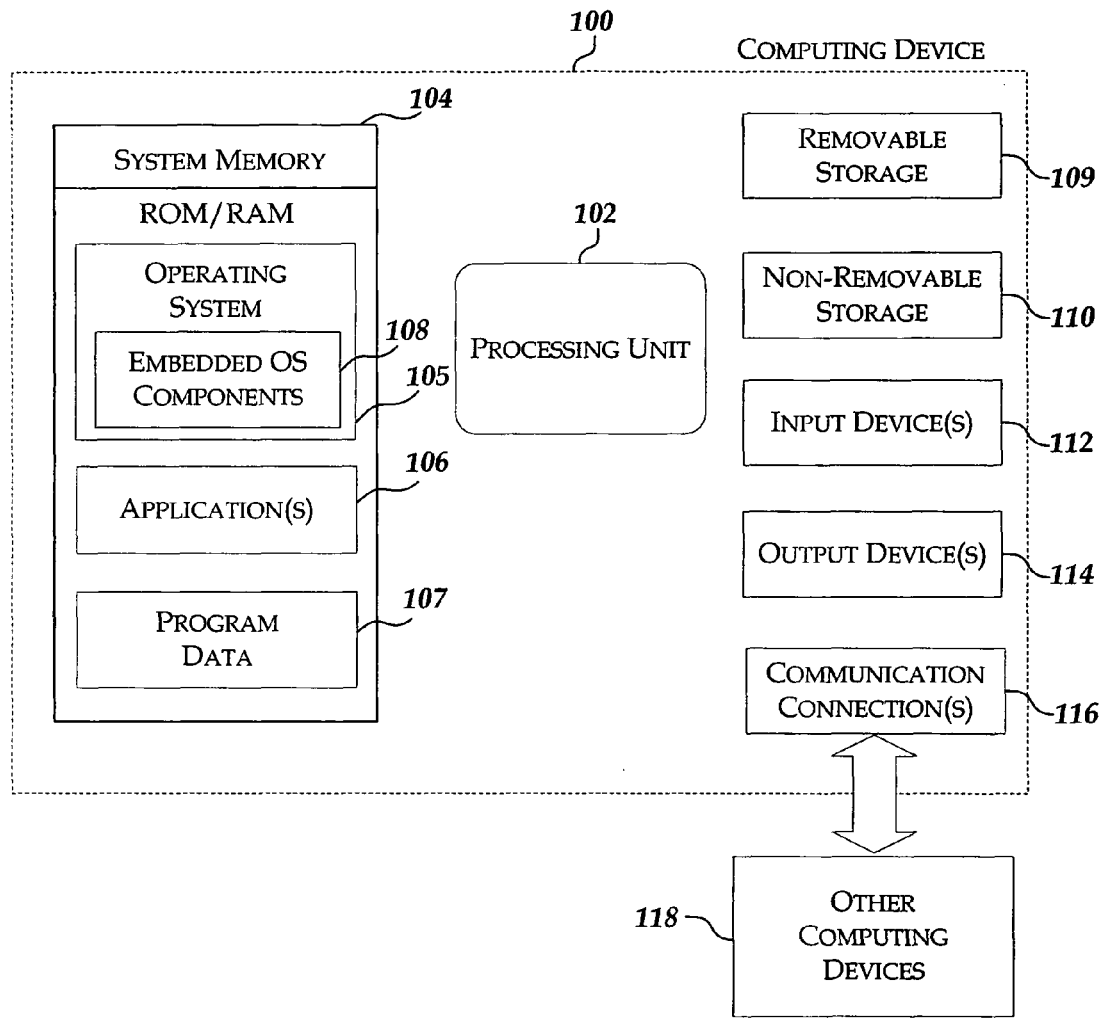
FIG. 1 is a functional diagram illustrating a computing device for deploying multiple embedded operating system components.

Referring to FIG. 1, a computing device into which multiple operating system images may be deployed is illustrated. Computing device 100 may be configured as a mobile computing device or as a conventional desktop computing device. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. Depending on how computing device is configured, the operating system 105 may be an operating system such as the WINDOWS CE® or WINDOWS XP operating systems available from the Microsoft Corporation of Redmond, Wash. Alternatively, another operating system may be utilized. In one embodiment, operating system includes embedded operating system components 108 that are deployed from the computing device to a target device as discussed in further detail below.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. The display may be an LCD, or any other type of display commonly used in a computing device. The display may be touch-sensitive, and would then also act as an input device.

Computing device 100 also contains communication connection(s) 116 that allow the device to communicate with other computing devices 118, such as over a wired network or a wireless network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The present disclosure is described in the general context of computer-executable instructions or components, such as software modules, being executed on a computing device. Generally, software modules include routines, programs, objects, components, data structures, and the like that perform particular tasks or implement particular abstract data types. Although described here in terms of computer-executable instructions or components, the present disclosure may equally be implemented using programmatic mechanisms other than software, such as firmware or special purpose logic circuits.

Deployment of Multiple Embedded Operating System Components

Figure 2:
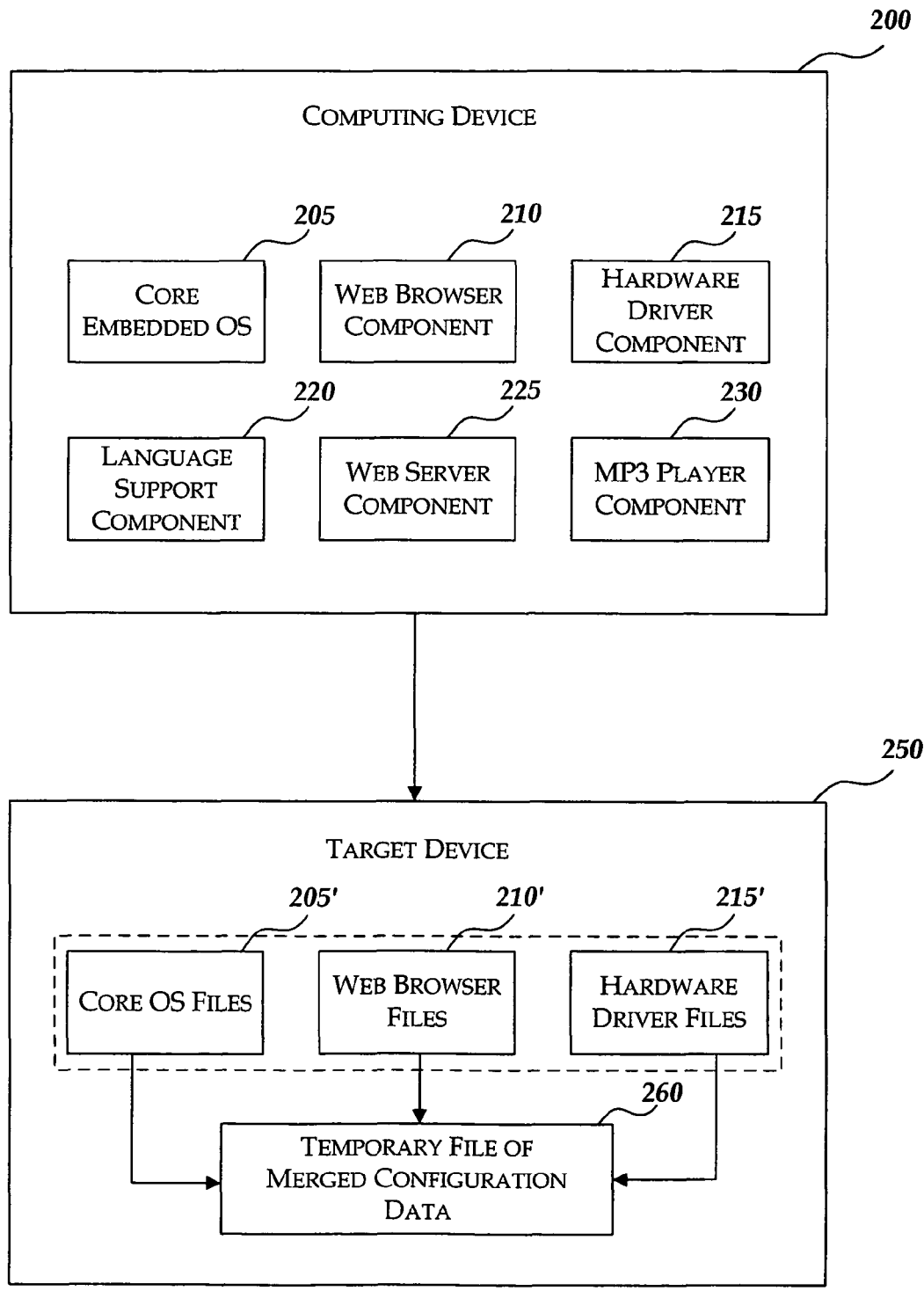
FIG. 2 is a conceptual diagram illustrating major functional blocks involved in a system for deploying multiple embedded operating system components from a computing device to a target device.

FIG. 2 is a conceptual diagram illustrating major functional blocks involved in a system for deploying multiple embedded operating system components from a computing device to a target device. The system includes an originating computing device, such as computing device 200, and a target computing device, such as target device 250. Computing device 200 includes core embedded operating system 205. Core embedded operating system 205 provides the computing elements to allow basic computing functions. Computing device 200 further includes multiple embedded operating system components that may be deployed to target device 250. The embedded operating system components provide extra features to expand the functionality of a computing device. Example embedded operating system components include web browser component 210, hardware driver component 215, language support component 220, web server component 225, and MP3 player component 230. In one embodiment, the embedded operating system components to be deployed are pre-installed on computing device 200. In another embodiment, the embedded operating system components to be deployed are created on computing device 200 using an embedded operating system tool kit such as the XP Embedded tool kit developed by Microsoft Corporation of Redmond, Wash.

It is understood that the embedded operating system components may include any operating system feature that may be used by target device 250. For example, hardware driver component 215 may be a fixed set of drivers for specific peripheral devices attached to target device 215 at the time of deployment. In another example, hardware driver component 215 may include all possible drivers for any peripheral device that may be attached to target device 250 at some time after deployment.

Each embedded operating system component includes configuration data. The configuration data may include values associated with configuration settings. Example configuration settings include user profiles, applications that are installed on the computing device, supported hardware, registered ports, and operating system paths. The configuration data of different embedded operating system components may conflict because each embedded operating system component is created independently of other embedded operating system components.

A user selects which embedded operating system components to deploy to target device 200. For example, the user may select web browser component 210 and hardware driver component 215 for deployment to target device 250 from a user interface on computing device 200. Core embedded operating system 205 is deployed and installed on target device 250 before the user-selected embedded operating system components are deployed. Temporary file 260 is created and configuration data associated with core embedded operating system 205 is stored in temporary file 260.

The selected embedded operating system components are then deployed to target device 250. For example, web browser component 210 is first deployed and installed on target device 250 as web browser files 210'. As discussed in detail below, configuration data is extracted from web browser component 210 and stored in temporary file 260. The configuration data associated with web browser component 210 is merged with the configuration data associated with core embedded operating system 205 in temporary file 260. Hardware component 215 is then deployed and installed on target device 250 as hardware driver files 215'. Configuration data is extracted from hardware driver component 215 and merged with the merged configuration data stored in temporary file 260. In one embodiment, the embedded operating system components may be selected and sequentially deployed to target device 250. In another embodiment, the embedded operating system components may be selected for deployment at different times such that the embedded operating system components are intermittently deployed to target device 250 over a period of time.

In standard operation, after an operating system component is deployed, for example, to an embedded operating system in a target device, the target device requires a system reboot to resolve any conflicts between configuration data values of different operating system components. The system reboot causes an application to execute that initializes many system variables, files and configuration settings. Each operating system component includes initialization commands stored with the corresponding configuration data. The initialization commands for each operating system component are sequenced independently of other operating system component initialization commands. Thus, the system reboot is necessary to resolve any conflicts between different operating system component initialization commands that may cause the system to fail.

To resolve the conflicts without rebooting the entire system, the configuration data for core embedded operating system 205 and the embedded operating system components selected for deployment are extracted and merged such that any conflicts between configuration data are resolved. Core embedded operating system 205 may be deployed and installed on target device 250 as core embedded operating system files 205' without any conflict because core embedded operating system 205 is usually deployed before any other embedded operating system component. The configuration data associated with core embedded operating system 205 is extracted and stored in temporary file 260.

Configuration data is extracted from the next embedded operating system component that is deployed (e.g., web browser component 210). The extracted configuration data is merged with the core operating system configuration data in temporary file 260. In one embodiment, any conflicts between the configuration data of the first deployed embedded operating system component and the configuration data of the core embedded operating system 205 may result in configuration values in core embedded operating system 205 being updated in accordance with a new embedded operating system version or a new version of the embedded operating system component. The values may be updated in accordance with a core intelligent merge rule such that a value in the core embedded operating system is updated in accordance with the corresponding value in the deployed embedded operating system component whereby the two values are equal. For example, core embedded operating system 205 may include a configuration setting with a value of 5. Web browser component 210 may have the same configuration setting value set to 6. The core intelligent merge rule automatically resolves the conflict by changing the configuration setting of core embedded operating system 205 from 5 to 6.

As discussed below, any conflicts that would arise from subsequently deployed embedded operating system components (e.g., hardware driver component 215) are resolved by applying merge rules to the configuration data of the deployed embedded operating system component and the merged configuration data already stored in temporary file 260. In one embodiment, an intelligent merge may be applied to a list of different values for the same configuration setting such that all of the different values are assigned to the configuration setting. For example, the merged configuration data stored in temporary file 260 may have three string entries listed for a configuration setting value (e.g., A, B and C). Hardware driver component 215 may have two string entries listed for the same configuration setting value (e.g., C and D). The values may be merged such that the merged configuration data includes a combined string entry list for the configuration setting value (e.g., A, B, C and D).

In another embodiment, a configuration data conflict may be resolved by determining whether configuration data of the deployed embedded operating system component and the merged configuration data already stored in temporary file 260 include redundant values. If the configuration data includes redundant values, at least one value is changed to resolve the redundancy. For example, a command in the merged configuration data may have an execution sequence number of 1025. Another command in hardware driver component 215 may also have an execution sequence number of 1025. This conflict may be resolved by changing the execution sequence number in hardware driver component 215 from 1025 to 1026. Thus, the commands would be executed in sequence after hardware driver component 215 is deployed to target device 250. If the conflict was not resolved before hardware driver component 215 was deployed, hardware driver component 215 would overwrite the command of the merged configuration data. Thus, the command associated with execution sequence number 1025 in the merged configuration data would never execute such that the embedded operating system components that depend on the overwritten command would not execute properly in target device 250.

Figure 3:
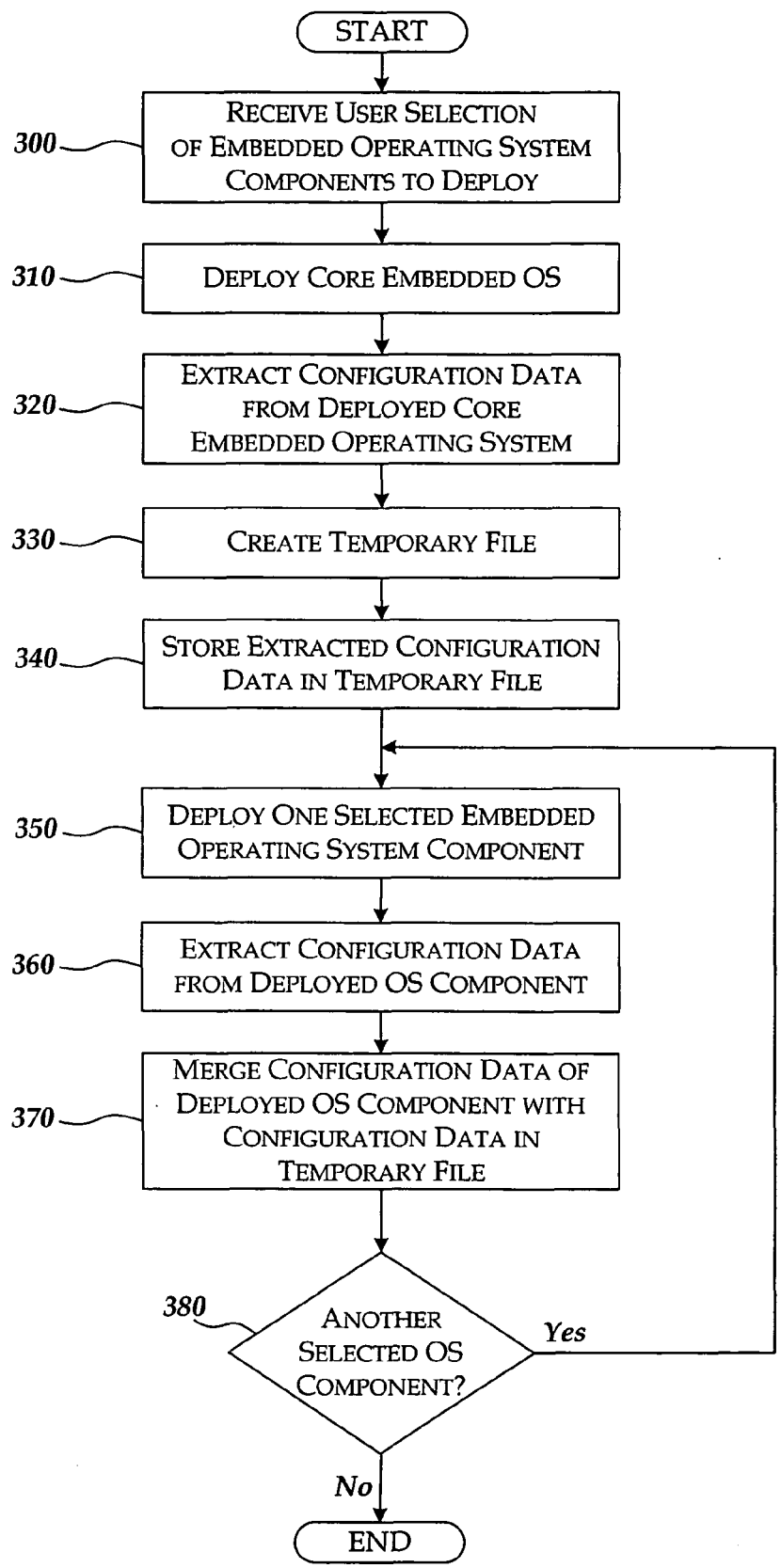
FIG. 3 is an operational flow diagram illustrating a process for deploying multiple embedded operating system components.

FIG. 3 is an operational flow diagram illustrating a process for installing an embedded operating system on a target device by deploying multiple embedded operating system components. The process begins at operation 300 where a user-selection of embedded operating system components to deploy to a target device is received. The embedded operating system components provide extra features to expand the functionality of the target device. The user may select the embedded operating system components to deploy all at once or over a period of time. The embedded operating system components may be selected for deployment from a user interface.

Advancing to operation 310, a core embedded operating system is deployed to the target device. The core embedded operating system includes the computing elements that are necessary to provide the target device with basic computing functions. Transitioning to operation 320, configuration data is extracted from the deployed core embedded operating system. The configuration data may include values associated with configuration settings. Continuing to operation 330, a temporary file is created. Moving to operation 340, the configuration data extracted from the core embedded operating system is stored in the temporary file.

Proceeding to operation 350, one of the selected embedded operating system components is deployed to the target device. Advancing to operation 360, configuration data is extracted from the deployed embedded operating system component. Transitioning to operation 370, the configuration data extracted from the deployed embedded operating system component is merged with the configuration data extracted from the core embedded operating system in the temporary file. Any configuration data conflicts are resolved during the merge process in accordance with defined merge rules. Example merge rules include updating a value in the core embedded operating system to correspond to a value in an embedded operating system component, compiling a list of different values for the same configuration setting, and changing a redundant value such that the value is no longer redundant.

Continuing to decision operation 380, a determination is made whether another embedded operating system component was selected for deployment by the user. If the user selected another embedded operating system component to deploy, processing continues to operation 350 where the process repeats such that the configuration data extracted from the next embedded operating system component is merged with the merged configuration data stored in the temporary file. If the user did not select another embedded operating system component to deploy, processing terminates at an end operation.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for installing an embedded operating system on a target computing device by deploying multiple embedded operating system components from an originating computing device to the target computing device, comprising:

receiving a selection of a first embedded operating system component and a second embedded operating system component to install on the target computing device, wherein the first embedded operating system component is associated with a set of first files and first configuration data, and further wherein the second embedded operating system component is associated with a set of second files and second configuration data;

deploying a core embedded operating system to the target device, wherein the core embedded operating system comprises core operating system files and core configuration data;

deploying the set of first files to the target computing device, wherein the set of first files is stored on the target computing device with the core operating system files;

deploying the first configuration data to the target computing device;

merging the first configuration data with the core configuration data by resolving any conflicts between the first configuration data and the core configuration data;

deploying the set of second files to the target computing device, wherein the set of second files is stored on the target computing device with the set of first files and the core operating system files;

deploying the second configuration data to the target computing device;

merging the second configuration data with the merged first configuration data and core configuration data by resolving any conflicts between the second configuration data and the merged first configuration data and core configuration data; and wherein resolving any conflicts between the second configuration data and the merged first configuration data and core configuration data comprises changing a value in one of the second configuration data and the merged first configuration data and core configuration data when the corresponding value in the other of the merged first configuration data and core configuration data and the second configuration data is redundant such that the value in the second configuration data is different than the corresponding value in the merged first configuration data and core configuration data.

2. The computer-implemented method of claim 1, further comprising:

extracting the core configuration data from the core embedded operating system;

extracting the first configuration data from the first embedded operating system component; and extracting the second configuration data from the second embedded operating system component.

3. The computer-implemented method of claim 1, further comprising:

creating a temporary file;

storing the core configuration data in the temporary file;

storing the first configuration data in the temporary file; and merging the first configuration data with the core configuration data in the temporary file.

4. The computer-implemented method of claim 1, further comprising:

creating a temporary file;

storing the core configuration data in the temporary file;

storing the first configuration data in the temporary file;

storing the second configuration data in the temporary file; and merging the second configuration data with the merged first configuration data and core configuration data in the temporary file.

5. The computer-implemented method of claim 1, wherein merging the first configuration data with the core configuration data further comprises resolving any conflicts between the first configuration data and the core configuration data without rebooting the target computing device.

6. The computer-implemented method of claim 1, wherein resolving any conflicts between the first configuration data and the core configuration data comprises updating a value in the core configuration data with the corresponding value in the first configuration data when the value in the core configuration data does not equal the corresponding value in the first configuration data.

7. The computer-implemented method of claim 1, wherein resolving any conflicts between the first configuration data and the core configuration data comprises changing a value in one of the first configuration data and the core configuration data when the corresponding value in the other of the core configuration data and the first configuration data is redundant such that the value in the first configuration data is different than the corresponding value in the core configuration data.

8. The computer-implemented method of claim 1, wherein merging the second configuration data with the merged first configuration data and core configuration data further comprises resolving any conflicts between the second configuration data and the merged first configuration data and core configuration data without rebooting the target computing device.

9. The computer-implemented method of claim 1, wherein resolving any conflicts between the second configuration data and the merged first configuration data and core configuration data comprises compiling a list of values for a configuration setting in the second configuration data and values for the corresponding configuration setting in the merged first configuration data and core configuration data such that the compiled list comprises all of the different values for the configuration setting.

10. A system for installing an embedded operating system on a target computing device by deploying multiple embedded operating system components, comprising an originating computing device and the target computing device, wherein:

the originating computing device is arranged to:

receive a selection of a first embedded operating system component and a second embedded operating system component to deploy to the target computing device, wherein the first embedded operating system component is associated with a set of first files and first configuration data, and further wherein the second embedded operating system component is associated with a set of second files and second configuration data;

deploy a core embedded operating system to the target computing device, wherein the core embedded operating system comprises core operating system files and core configuration data;

deploy the set of first files to the target computing device, wherein the set of first files is stored on the target computing device with the core operating system files;

deploy the first configuration data to the target computing device;

deploy the set of second files to the target computing device, wherein the set of second files is stored on the target computing device with the set of first files and the core operating system files;

deploy the second configuration data to the target computing device; and the target computing device is arranged to:

merge the first configuration data with the core configuration data by resolving any conflicts between the first configuration data and the core configuration data, wherein any conflicts are resolved without rebooting the target computing device; and merge the second configuration data with the merged first configuration data and core configuration data by resolving any conflicts between the second configuration data and the merged first configuration data and core configuration data, wherein any conflicts are resolved without rebooting the target computing device, wherein the target computing device is further arranged to resolve any conflicts between the second configuration data and the merged first configuration data and core configuration data by changing a value in one of the second configuration data and the merged first configuration data and core configuration data when the corresponding value in the other of the merged first configuration data and core configuration data and the second configuration data is redundant such that the value in the second configuration data is different than the corresponding value in the merged first configuration data and core configuration data.

11. The system of claim 10, wherein the target computing device is further arranged to resolve any conflicts between the first configuration data and the core configuration data by updating a value in the core configuration data with the corresponding value in the first configuration data when the value in the core configuration data does not equal the corresponding value in the first configuration data.

12. The system of claim 10, wherein the target computing device is further arranged to resolve any conflicts between the first configuration data and the core configuration data by changing a value in one of the first configuration data and the core configuration data when the corresponding value in the other of the core configuration data and the first configuration data is redundant such that the value in the first configuration data is different than the corresponding value in the core configuration data.

13. The system of claim 10, wherein the target device is further arranged to resolve any conflicts between the second configuration data and the merged first configuration data and core configuration data by compiling a list of values for a configuration setting in the second configuration data and values for the corresponding configuration setting in the merged first configuration data and core configuration data such that the compiled list comprises all of the different values for the configuration setting.

14. A computer-readable storage medium storing computer-executable instructions for installing an embedded operating system on a target computing device by deploying multiple embedded operating system components from an originating computing device to a target computing device, the instructions comprising:
 receiving a selection of a first embedded operating system component and a second embedded operating system component to install on the target computing device, wherein the first embedded operating system component is associated with a set of first files and first configuration data, and further wherein the second embedded operating system component is associated with a set of second files and second configuration data;
 deploying a core embedded operating system to the target computing device, wherein the core embedded operating system comprises core operating system files and core configuration data, and further wherein the core configuration data is extracted from the core embedded operating system and stored in a temporary location on the target computing device;
 deploying the set of first files to the target computing device, wherein the set of first files is stored on the target computing device with the core operating system files;
 deploying the first configuration data to the target computing device, wherein the first configuration data is extracted from the first embedded operating system component and stored in the temporary location on the target computing device;
 merging the first configuration data with the core configuration data in the temporary location by resolving any conflicts between the first configuration data and the core configuration data;
 deploying the set of second files to the target computing device, wherein the set of second files is stored on the target computing device with the set of first files and the core operating system files;
 deploying the second configuration data to the target device, wherein the second configuration data is extracted from the second embedded operating system component and stored in the temporary location on the target computing device; and
 merging the second configuration data with the merged first configuration data and core configuration data in the temporary location by resolving any conflicts between the second configuration data and the merged first configuration data and core configuration data, wherein resolving any conflicts between the second configuration data and the merged first configuration data and core configuration data comprises changing a value in one of the second configuration data and the merged first configuration data and core configuration data when the corresponding value in the other of the merged first configuration data and core configuration data and the second configuration data is redundant such that the value in the second configuration data is different than the corresponding value in the merged first configuration data and core configuration data.

15. The computer-readable medium of claim 14, wherein resolving any conflicts between the first configuration data and the core configuration data comprises updating a value in the core configuration data with the corresponding value in the first configuration data when the value in the core configuration data does not equal the corresponding value in the first configuration data.

16. The computer-readable medium of claim 14, wherein resolving any conflicts between the first configuration data and the core configuration data comprises changing a value in one of the first configuration data and the core configuration data when the corresponding value in the other of the core configuration data and the first configuration data is redundant such that the value in the first configuration data is different than the corresponding value in the core configuration data.

17. The computer-readable medium of claim 14, wherein resolving any conflicts between the second configuration data and the merged first configuration data and core configuration data comprises compiling a list of values for a configuration setting in the second configuration data and values for the corresponding configuration setting in the merged first configuration data and core configuration data such that the compiled list comprises all of the different values for the configuration setting.

* * * * *